March 24, 1936.  K. STAIB ET AL  2,034,999
JOINT PRODUCTION OF A SODA LYE, POOR IN SODIUM CHLORIDE, AND OF GLAUBER SALT
Filed Aug. 10, 1934
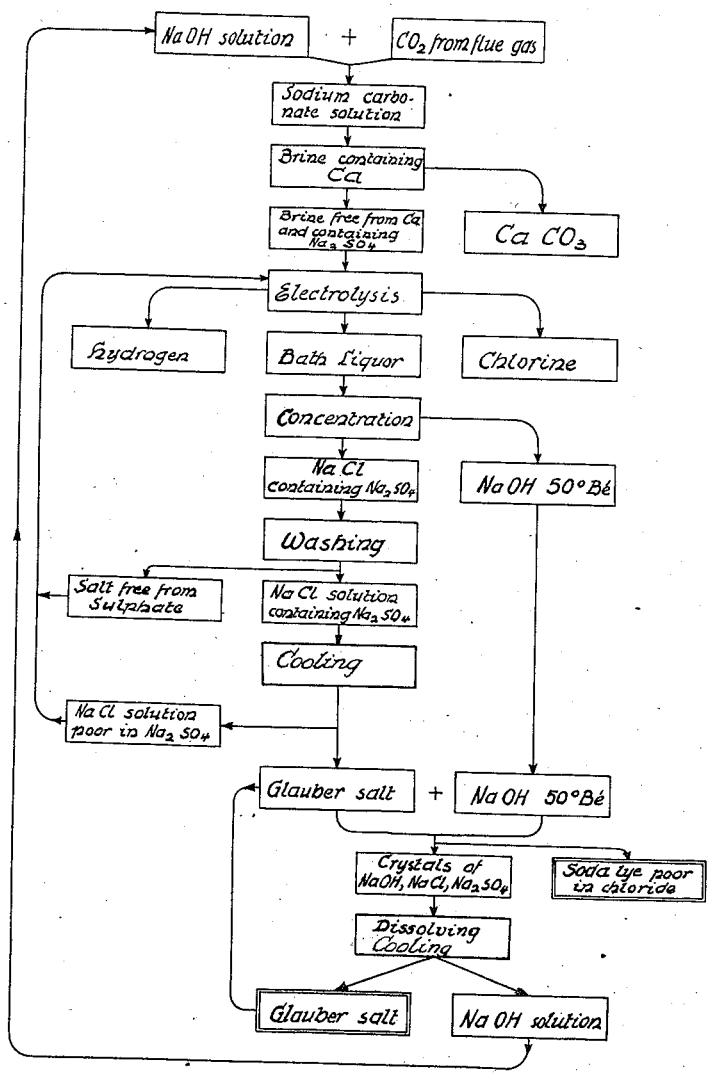
Inventors:
Karl Staib,
Hermann Heres,
By Attorneys
Potter, Pierce & Scheffler Patented Mar. 24, 1936

2,034,999

UNITED STATES PATENT OFFICE 2,034,999

JOINT PRODUCTION OF A SODA LYE, POOR IN SODIUM CHLORIDE, AND OF GLAUBER SALT

Karl Staib and Hermann Heres, Rheinfelden in Baden, Germany, assignors to I. G. Farbenindustrie Aktiengesellschaft, Frankfort-on-the-Main, Germany Application August 10, 1934, Serial No. 739,312
In Germany August 19, 1933

3 Claims. (Cl. 23—122)

This invention relates to a process for the joint production of a soda lye, poor in sodium chloride, and of Glauber salt.

Natural brine generally contains in solution potassium sulphate, and usually also magnesium salts. If such brine is to be subjected to electrolysis in diaphragm cells, in order to obtain sodium hydroxide, it must first be freed from calcium and magnesium salts in order to avoid clogging the diaphragm. This removal of calcium and magnesium can be effected by the aid, inter alia, of sodium carbonate, the sparingly soluble carbonates of calcium and magnesium being thereby precipitated, whereas the $SO_4$ radicle derived from the calcium sulphate remains in solution as sodium sulphate. If this brine—which depending on its origin, may contain about 7 to 10 grams of sodium sulphate per liter—be subjected to electrolysis, the sodium chloride will be decomposed, according to the current strength, into caustic soda, chlorine and hydrogen, whilst the sodium sulphate will remain undecomposed, together with unaltered sodium chloride, in solution in the resulting "bath liquor". This latter is usually concentrated to a soda lye of 1.53 sp. gr., the bulk of the sodium chloride separating out as such whilst a portion forms a well-crystallized triple salt with sodium sulphate and sodium hydroxide. In order to prevent enrichment in sodium sulphate when the dissolved saline mixture is used again for the electrolysis, the practice is to discard the sodium chloride fraction which contains the largest amount of sodium sulphate, and which as such is easily recognizable, and thus to put up with the loss of a certain amount of salt.

It has now been ascertained in accordance with the present invention, that it is possible to operate without this loss by washing the sodium sulphate from the sulphate bearing salt, and causing the sodium sulphate to separate out from the sufficiently concentrated solution by cooling. The sodium sulphate is thus obtained as a directly marketable product in the form of Glauber salt. The common salt, low in sodium sulphate, which remains after the leaching, is dissolved and returned to the electrolysis.

The concentrated soda lye is saturated with sodium chloride, and thus contains more of the latter than is desired by some consumers. Such chloride-bearing lyes can be freed from most of the dissolved sodium chloride by known processes by reaction with sodium sulphate, advantage being taken of the formation of the aforesaid triple salt.

It has moreover been ascertained that the production of lye poor in chloride can be cheaply and economically combined with the production of Glauber salt if, instead of employing the customary anhydrous sulphate a Glauber salt obtained by refrigeration in the course of the process itself be employed for forming the triple salt. The preferred method is to treat the warmed, concentrated liquor with the corresponding amount of Glauber salt, stirring the mixture and cooling it after a short time. The triple salt, which is sparingly soluble in the strong liquor separates out, and its formation has consumed so much sodium chloride that only small quantities of the latter remain in the soda lye.

The triple salt also can be further utilized by decomposing it by solution in water and then recovering the sodium sulphate by cooling until crystallization of Glauber salt is effected. This Glauber salt may be used again for forming the triple salt in the soda lye. On account of its concentration in caustic soda, the resulting mother liquor is converted by means of carbon dioxide into sodium carbonate solution, which serves for removing the alkaline earth cations from fresh quantities of brine.

The herein described combination of steps results in the production in the one plant of:—

(1) A lye poor in chloride;

(2) The agent for producing the same and a saleable end product (Glauber salt); and (3) The agent ($Na_2CO_3$) for refining the brine.

In this way, the products of the electrolysis of the brine are obtained in a purer state, and with a greater yield, than heretofore.

In order to facilitate understanding of the invention, a method of carrying out the process thereof will now be explained with reference to the accompanying diagrammatic drawing.

Caustic soda solution (from the decomposition of the triple salt) is subjected to the action of carbon dioxide from flue gases. The resulting sodium carbonate solution is stirred, in approximately the calculated amount, into a natural brine containing about 7 grams of $CaSO_4$ and 300 grams of NaCl per liter, calcium carbonate being precipitated and separated from the brine by filtration. The brine now contains about 7 grams of sodium sulphate and about 300 grams of sodium chloride per liter, and is subjected to electrolysis, a solution of, for example, 130 grams of NaOH, 170 grams of NaCl and 8 grams of $Na_2SO_4$ being formed in the cathode chamber. This liquor is concentrated to a sp. gr. of 1.53, NaCl and $Na_2SO_4$ separating out. After cooling, the liquor still contains about 2 parts of NaCl per 100 of NaOH. The sulphate-bearing salt is washed and is returned to the electrolysis, either as solid salt or after being dissolved in water, according to the system of electrolysis employed. The washings, containing about 70 grams of $Na_2SO_4$ and 290 grams of NaCl per liter, are strongly cooled, accompanied by stirring, a very pure Glauber salt separating out. After separating the mother liquor and the Glauber salt, the former is returned to the electrolysis. A portion of the Glauber salt is taken for sale, the remainder being employed for the production of liquor poor in chloride. For this purpose, the concentrated soda lye, containing the above quantity of chloride, is warmed to about 80° C. and is stirred with the calculated amount of Glauber salt (about 90 kg. of Glauber salt per cubicmeter of lye). After cooling, the clear lye contains only about 0.3 part of NaCl per 100 parts of NaOH. The precipitated triple salt, consisting, in the unwashed state, of about 14 per cent. of NaCl, 25 per cent. of NaOH and 43 per cent. of $Na_2SO_4$, the remainder being water, is converted, after taking up in a twofold quantity of water, into a solution containing about 116 grams of NaOH, 66 grams of NaCl and 200 grams of $Na_2SO_4$, which is now cooled, crystalline Glauber salt being again deposited. At the same time, a mother liquor containing 140 grams of NaOH and 90 grams of NaCl is obtained, from which, as already mentioned, a solution of sodium carbonate for purifying the brine is obtained by the aid of flue gases containing carbon dioxide. The slightly alkaline moist Glauber salt thus obtained is preferably used again for the production of lye poor in chloride.

What we claim is:—

1. A process for the joint production of soda lye poor in sodium chloride, and of Glauber salt, which comprises treating crude brine with sodium carbonate, to precipitate calcium carbonate and magnesium carbonate, subjecting the recovered brine, containing sodium sulphate, to electrolysis, concentrating the resulting soda lye, containing sodium sulphate, washing the sodium sulphate out of the sodium chloride (containing said sulphate) deposited during the concentration, depositing Glauber salt from the sodium sulphate solution by cooling, causing a portion of the Glauber salt to react with the concentrated warm soda lye, for the purpose of forming the triple salt (NaCl, $Na_2SO_4$, NaOH, $H_2O$) and separating the lye poor in chloride after cooling from said triple salt.

2. A process for the joint production of soda lye poor in sodium chloride, and of Glauber salt, which comprises treating crude brine with sodium carbonate, to precipitate calcium carbonate and magnesium carbonate, subjecting the recovered brine, containing sodium sulphate, to electrolysis, concentrating the resulting soda lye, containing sodium sulphate, washing the sodium sulphate out of the sodium chloride (containing said sulphate) deposited during the concentration, depositing Glauber salt from the sodium sulphate solution by cooling, causing a portion of the Glauber salt to react with the concentrated warm soda lye, for the purpose of forming the triple salt (NaCl, $NaSO_4$, NaOH, $H_2O$), separating the lye poor in chloride after cooling from said triple salt, redissolving the said triple salt in water and depositing Glauber salt from the solution by cooling and filtration.

3. A process for the joint production of soda lye poor in sodium chloride, and of Glauber salt, which comprises treating crude brine with sodium carbonate, to precipitate calcium carbonate and magnesium carbonate, subjecting the recovered brine, containing sodium sulphate, to electrolysis, concentrating the resulting soda lye, containing sodium sulphate, washing the sodium sulphate out of the sodium chloride (containing said sulphate) deposited during the concentration, depositing Glauber salt from the sodium sulphate solution by cooling, causing a portion of the Glauber salt to react with the concentrated warm soda lye, for the purpose of forming the triple salt (NaCl, $Na_2SO_4$, NaOH, $H_2O$), separating the lye poor in chloride after cooling from said triple salt, redissolving the said triple salt in water, depositing Glauber salt from the solution by cooling and filtration, treating the remaining mother liquor with carbon dioxide to form sodium carbonate and reintroducing the latter into the first step of the process for the treatment of crude brine.

KARL STAIB.
HERMANN HERES.